(12) United States Patent
Mahajan et al.

(10) Patent No.: US 7,606,177 B1
(45) Date of Patent: Oct. 20, 2009

(54) VALUE-ADDED FEATURES FOR THE SPANNING TREE PROTOCOL

(75) Inventors: Umesh Mahajan, Fremont, CA (US); Ramana Mellacheruvu, Sunnyvale, CA (US); Praveen Jain, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 562 days.

(21) Appl. No.: 10/657,499

(22) Filed: Sep. 8, 2003

Related U.S. Application Data

(63) Continuation of application No. 09/208,175, filed on Dec. 9, 1998, now Pat. No. 6,628,624.

(51) Int. Cl.
  *H04L 12/56* (2006.01)
(52) U.S. Cl. .................. 370/256; 370/390; 370/392; 370/401
(58) Field of Classification Search .................. 370/238, 370/249, 252, 254–256, 390, 392, 400, 401, 370/402, 429, 471
  See application file for complete search history.

(56) References Cited

U.S. PATENT DOCUMENTS

| | | |
|---|---|---|
| 4,811,337 A | 3/1989 | Hart |
| 4,922,486 A | 5/1990 | Lidinsky et al. |
| 5,018,137 A | 5/1991 | Backes et al. |
| 5,138,615 A | 8/1992 | Lamport et al. |
| 5,150,360 A | 9/1992 | Perlman et al. |
| 5,265,092 A | 11/1993 | Soloway et al. |
| 5,280,480 A | 1/1994 | Pitt et al. |
| 5,323,394 A | 6/1994 | Perlman |
| 5,327,424 A | 7/1994 | Perlman |
| 5,394,402 A | 2/1995 | Ross |
| 5,398,242 A | 3/1995 | Perlman |
| 5,400,333 A | 3/1995 | Perlman |
| 5,606,669 A | 2/1997 | Bertin et al. |
| 5,734,824 A | 3/1998 | Choi |
| 5,740,171 A | 4/1998 | Mazzola et al. |
| 5,742,604 A | 4/1998 | Edsall et al. |
| 5,761,435 A | 6/1998 | Fukuda et al. |
| 5,764,636 A | 6/1998 | Edsall |
| 5,790,808 A | 8/1998 | Seaman |
| 5,844,902 A | 12/1998 | Perlman |
| 5,878,232 A | 3/1999 | Marimuthu |

(Continued)

OTHER PUBLICATIONS

Lucent Technologies Inc.'s Initial Disclosure of Prior Art Under Civil Local Rule 16-7, U.S. District Court for the Northern District of California, C.A. No. C98-20836JW (PVT) ENE, Nov. 18, 1998.

(Continued)

*Primary Examiner*—Pankaj Kumar
*Assistant Examiner*—Duc T Duong
(74) *Attorney, Agent, or Firm*—Cesari and McKenna LLP

(57) ABSTRACT

A method and apparatus facilitates and enhances the operation of the spanning tree protocol in bridged computer networks. An intermediate network device in accordance with the present invention includes an enhanced spanning tree engine that is configured to perform certain novel functions. First, the enhanced spanning tree engine is configured to identify and block ports at which messages are looped-back to the transmitting port, thereby avoiding the creation of network loops. In second aspect, the enhanced spanning tree engine rapidly transitions certain ports to a forwarding state to prevent associated applications from timing out and shutting down. Rather than moving the ports through blocking, listening and learning states before reaching the forwarding state, selected ports may be transitioned directly to the forwarding state.

25 Claims, 8 Drawing Sheets

U.S. PATENT DOCUMENTS

| | | | | |
|---|---|---|---|---|
| 6,032,194 | A | * | 2/2000 | Gai et al. ............... 709/239 |
| 6,081,512 | A | | 6/2000 | Muller et al. |
| 6,188,694 | B1 | | 2/2001 | Fine et al. |
| 6,202,114 | B1 | | 3/2001 | Dutt et al. |
| 6,236,659 | B1 | | 5/2001 | Pascoe |
| 6,262,977 | B1 | * | 7/2001 | Seaman et al. ............ 370/256 |
| 6,298,061 | B1 | * | 10/2001 | Chin et al. ............... 370/400 |
| 6,330,229 | B1 | * | 12/2001 | Jain et al. ............... 370/256 |

OTHER PUBLICATIONS

D. Delaney and M. Seaman, Single or Multiple Filtering Databases, May 8, 1997.

Horowitz, S., Dual-Layer Spanning Tree, A Spanning tree proposal for IEEE 802.1Q, pp. 1-4.

Mackinnon, A., Shukan, D., Desmarais, J. and Streff, William, Lucent Technologies Inc.'s Initial Disclosure of Prior Art Under Civil Local Rule 16-7-Case No. C98-20836 JW (PVT) ENE, Nov 18, 1998, pp. 1-5.

Hart, John, Extending the IEEE 802.1 MAC Bridge Standard to Remote Bridges, Jan. 1998-vol. 2, No. 1, pp. 10-15.

Yener, B., Bhandari, I., Ofek, Y. and Yung, M., Fault-Tolerant Convergence Routing, (c) 1994, pp. 54-64.

Perlman, Radia, Interconnections: Bridges and Router, (c) 1992, pp. 54-64.

P802.1d Draft Standard for Local Area Networks MAC (Media Access Control) Bridges: Technical and Editorial Corrections, (c) 1997, pp. 1-10, 85-122, 151-158.

Seaman, Mick, High Availability Spanning Tree, Rev. 1.1, pp. 1-15.

Information technology-Telecommunications and information exchange between systems-Local area networks-Media access control (MAC) bridges, International Standard ISO/IEC 10038:1993 ANSI/IEEE Std 802.1D, (c) 1993, pp. Table of Contents, 43-67, 82-83.

S. Horowitz, Dual-Layer Spanning Tree, (A Spanning Tree Proposal for IEEE 802.1Q) May 14, 1997.

M. Seaman, High Availability Spanning Tree, Rev. 1.1, Oct. 26, 1998.

J. Hart, Extending the IEEE 802.1 MAC Bridge Standard to Remote Bridges, IEEE Network, Jan. 1998, vol. 2, No. 1, pp. 10-15.

R. Perlman, Interconnections: Bridges and Routers, Copyright 1992 by Addison-Wesley Publishing Company, Inc., pp. 54-64.

B. Yener, et al., Fault-Tolerant Convergence Routing, Copyright 1994 IEEE.

IEEE P802.1d Draft Standard for Local Area Networks MAC (Media Access Control) Bridges: Technical and Editorial Corrections, Copyright 1997 IEEE, pp. 1-10, 85-122 and 151-158.

Draft Standard P802.1Q/D10 IEEE Standards for Local and Metropolitan Area Networks: Virtual Bridged Local Area Networks, P802.1Q/D1, Mar. 22, 1998, pp. 1-212.

Horowitz, S., "Dual-Layer Spanning Tree," A Spanning tree proposal for IEEE 802.1Q, May 14, 1997, pp. 1-4.

Seaman, Mick, "High Availability Spanning Tree," Rev. 1.1. Oct. 26, 1998, pp. 1-15.

* cited by examiner

VALUE-ADDED FEATURES FOR THE SPANNING TREE PROTOCOL

This application is a continuation of application Ser. No. 09/208,175, filed Dec. 9, 1998 now U.S. Pat. No. 6,628,624.

CROSS-REFERENCE TO RELATED APPLICATIONS

This application is related to the following copending U.S. Patent Applications:

U.S. patent application Ser. No. 08/997,297 entitled, SHARED SPANNING TREE PROTOCOL, filed Dec. 23, 1997; and U.S. patent application Ser. No. 08/998,412 entitled, FAST RECONFIGURATION OF SPANNING TREES, filed Dec. 24, 1997, each of which is assigned to the assignee of the present application.

FIELD OF THE INVENTION

The present invention relates generally to computer networks, and more specifically, to a method and apparatus for improving and facilitating the identification and selection of loop-free topologies in computer networks.

BACKGROUND OF THE INVENTION

A computer network typically comprises a plurality of interconnected entities. An entity may consist of any device, such as a computer or end station, that "sources" (i.e., transmits) or "sinks" (i.e., receives) data frames. A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs may be interconnected by point-to-point links, microwave transceivers, satellite hook-ups, etc. to form a wide area network ("WAN") or intranet that may span an entire country or continent.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information between a plurality of LANs or end stations. Typically, the bridge or switch is a computer and includes a plurality of ports that couple the device to the LANs or end stations. Ports used to couple switches to each other are generally referred to as a trunk ports, whereas ports used to couple a switch to LANs or end stations are generally referred to as access ports. The switching function includes receiving data from a sending entity at a source port and transferring that data to at least one destination port for forwarding to the receiving entity.

Switches and bridges typically learn which destination port to use in order to reach a particular entity by noting on which source port the last message originating from that entity was received. This information is then stored by the bridge in a block of memory referred to as a filtering database. Thereafter, when a message addressed to a given entity is received on a source port, the bridge looks up the entity in its filtering database and identifies the appropriate destination port to reach that entity. If no destination port is identified in the filtering database, the bridge floods the message out all ports, except the port on which the message was received. Messages addressed to broadcast or multicast addresses are also flooded.

Additionally, most computer networks include redundant communications paths so that a failure of any given link or device does not isolate any portion of the network. The existence of redundant links, however, may cause the formation of circuitous paths or "loops" within the network. Loops are highly undesirable because data frames may traverse the loops indefinitely. Furthermore, because switches and bridges replicate (i.e., flood) frames whose destination port is unknown or which are directed to broadcast or multicast addresses, the existence of loops may cause a proliferation of data frames that effectively overwhelms the network.

Spanning Tree Algorithm

To avoid the formation of loops, most intermediate network devices execute a spanning tree algorithm which allows them to calculate an active network topology that is loop-free (i.e., a tree) and yet connects every pair of LANs within the network (i.e., the tree is spanning). The Institute of Electrical and Electronics Engineers (IEEE) has promulgated a standard (the 802.1D standard) that defines a spanning tree protocol to be executed by 802.1D compatible devices. In general, by executing the spanning tree algorithm, bridges elect a single bridge to be the "root" bridge. Since each bridge has a unique numerical identifier (bridge ID), the root is typically the bridge with the lowest bridge ID. In addition, for each LAN coupled to more than one bridge, only one (the "designated bridge") is elected to forward frames to and from the respective LAN. The designated bridge is typically the one closest to the root. Each bridge also selects one port (its "root port") which gives the lowest cost path to the root. The root ports and designated bridge ports are selected for inclusion in the active topology and are placed in a forwarding state so that data frames may be forwarded to and from these ports and thus onto the corresponding paths or links of the network. Ports not included within the active topology are placed in a blocking state. When a port is in the blocking state, data frames will not be forwarded to or received from the port. A network administrator may also exclude a port from the spanning tree by placing it in a disabled state.

To obtain the information necessary to run the spanning tree protocol, bridges exchange special messages called configuration bridge protocol data unit (BPDU) messages. FIG. 1 is a block diagram of a conventional BPDU message 100. The BPDU message 100 includes a message header 102 compatible with the Media Access Control (MAC) layer of the respective LAN standard. The message header 102 comprises a destination address (DA) field 104, a source address (SA) field 106, and a Service Access Point (SAP) field 108, among others. The DA field 104 carries a unique bridge multicast destination address assigned to the spanning tree protocol. Appended to header 102 is a BPDU message area 110 that also contains a number of fields, including a root identifier (ROOT ID) field 112, a root path cost field 114, a bridge identifier (BRIDGE ID) field 116, a port identifier (PORT ID) field 118, a message age (MSG AGE) field 120, a maximum age (MAX AGE) field 122, a hello time field 124, and a forward delay (FWD DELAY) field 126, among others. The root identifier field 112 typically contains the identifier of the bridge assumed to be the root and the bridge identifier field 116 contains the identifier of the bridge sending the BPDU. The root path cost field 114 contains a value representing the cost to reach the assumed root from the port on which the BPDU is sent and the port identifier field 118 contains the port number of the port on which the BPDU is sent.

Each bridge initially assumes itself to the be the root and transmits BPDU messages accordingly. As a result, bridges continuously receive BPDU messages. Upon receipt of a BPDU message, its contents are examined and compared with similar information (e.g., assumed root and lowest root path cost) stored by the receiving bridge. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDU messages are not forwarded by bridges, the identifier of the root is eventually propagated to and adopted by all bridges as described above, allowing them to select their root port and any designated port(s).

In order to adapt the active topology to failures, the root periodically (e.g., every hello time) transmits BPDU messages. The hello time utilized by the root is also carried in the hello time field 124 of its BPDU messages. The default hello time is two seconds. In response to receiving BPDUs, bridges transmit their own BPDUs. Thus, every two seconds BPDUs are propagated throughout the bridged network, thereby confirming the active topology. As shown in FIG. 1, BPDU messages stored by the bridges also include a message age field 120 which corresponds to time since the root instigated the generation of this BPDU information. That is, BPDU messages from the root have their message age field 120 set to "0". Thus, every hello time, BPDU messages with a message age of "0" are propagated to and stored by the bridges.

After storing these BPDU messages, bridges proceed to increment the message age value every second. When the next BPDU message is received, the bridge examines the contents of the message age field 120 to determine whether it is smaller than the message age of its stored BPDU message. Assuming the received BPDU message originated from the root and thus has a message age of "0", the received BPDU message is considered to be "better" than the stored BPDU information (whose message age has presumably been incremented to "2" seconds) and, in response, the bridge proceeds to re-calculate the root, root path cost and root port based upon the received BPDU information. The bridge also stores this received BPDU message and proceeds to increment its message age field 120. If the message age of a stored BPDU message reaches a maximum age value, the corresponding BPDU information is considered to be stale and is discarded by the bridge.

Normally, each bridge replaces its stored BPDU information every hello time, thereby preventing it from being discarded and maintaining the current active topology. If a bridge stops receiving BPDU messages on a given port (indicating a possible link or device failure), it will continue to increment the respective message age value until it reaches the maximum age threshold. The bridge will then discard the stored BPDU information and proceed to re-calculate the root, root path cost and root port by transmitting BPDU messages utilizing the next best information it has. The maximum age value used within the bridged network is typically set by the root, which enters the appropriate value in the maximum age field 122 of its transmitted BPDU messages. Neighboring bridges similarly load this value in their BPDU messages, thereby propagating the selected value throughout the network. The maximum age value under the IEEE standard is twenty seconds.

As BPDU information is up-dated and/or timed-out and the active topology is recalculated, ports may transition from the blocking state to the forwarding state and vice versa. That is, as a result of new BPDU information, a previously blocked port may learn that it should be in the forwarding state (e.g., it is now the root port or a designated port). Rather than transition directly from the blocking state to the forwarding state, ports transition through two intermediate states: a listening state and a learning state. In the listening state, a port waits for information indicating that it should return to the blocking state. If, by the end of a preset time, no such information is received, the port transitions to the learning state. In the learning state, a port still blocks the receiving and forwarding of frames, but received frames are examined and the corresponding location information is stored in the filtering database, as described above. At the end of a second preset time, the port transitions from the learning state to the forwarding state, thereby allowing frames to be forwarded to and from the port. The time spent in each of the listening and the learning states is referred to as the forwarding delay and is entered by the root in field 126.

Although the spanning tree protocol is able to maintain a loop-free topology despite network changes and failures, recalculation of the active topology can be a time consuming and processor intensive task. For example, recalculation of the spanning tree following a network change or failure can take approximately 50 seconds (e.g., 20 seconds for BPDU information to time out, 15 seconds in the listening state and another 15 seconds in the learning state). During this time, message delivery is often delayed as ports transition between states. That is, ports in the listening and learning states do not forward or receive messages. In addition, certain applications or processes may time-out and shut down while the active topology is recalculated, resulting in even greater disruptions.

The conventional spanning tree protocol also consumes significant processor resources, which may degrade network performance. More specifically, bridges re-calculate the root and their root port and root path cost every time a "newer" BPDU message is received (e.g., every 2 seconds). As the active topology nears convergence and once it has converged, the root identifier and root path cost of these newer BPDU messages are identical to the stored BPDU information. That is, the processing of the received BPDU information will cause no change in the bridge's port states. Nevertheless, the bridge still proceeds to recalculate the active topology, wasting valuable processor resources.

The prior art spanning tree protocol is also unable to identify and eliminate all possible loops. In particular, some network configurations result in messages being looped-back to the port on which they were forwarded. For example, certain network cables or links loop-back messages. Additionally, a port may be configured by a network administrator to return copies of messages forwarded to the port. If such a configuration exists and the port is forwarding, then an undetected loop may arise. For example, a broadcast message forwarded from the port will loop-back (i.e., be returned) to the switch. The bridge, moreover, will assume that this is a new broadcast message and proceed to forward it on all of its other forwarding ports. The resulting proliferation of messages can overwhelm the network.

The existence of such a loop may not be detected by the conventional spanning tree protocol. More specifically, BPDU messages that are forwarded on such loop-back configured ports will similarly be returned to the transmitting port and the information in these "received" BPDU messages will be compared against the information currently stored for that port. As the information from these received BPDU messages cannot be "better" than the stored information (i.e., it is the same), the BPDU message is simply ignored and the bridge transitions the port to the forwarding state. Accordingly, the loop is not discovered and subsequent message proliferation may occur.

The spanning tree protocol's ability to define an active topology also degrades significantly in the presence of network congestion. Congestion refers to the inability of intermediate network devices to keep up with an increase in network traffic. More specifically, each network device typically has one or more priority queues associated with each port or interface. As messages are received, they are placed in the appropriate queue for forwarding. If messages are added to a given queue faster than they can be forwarded, however, the queue will eventually be filled forcing the device to drop any additional messages (including BPDU messages) for that queue. This may cause a downstream switch to stop receiving BPDUs on a blocked port, even though no failure or network change has occurred. In response, the BPDU information stored at the downstream switch may time out and be discarded. The downstream bridge may then transition its port from blocking to forwarding. The transition of this port to forwarding creates a loop (because the upstream port, although congested, is still in the forwarding state) and only adds to the congestion problem.

SUMMARY OF THE INVENTION

It is an object of the present invention to provide a method and apparatus for enhancing the operation of the spanning tree protocol in computer networks.

It is a further object of the present invention to provide a method and apparatus for reducing the time necessary to transition certain ports to a forwarding state.

Another object of the present invention is to provide a method and apparatus for detecting and blocking loops caused by loop-back connections or configurations.

Briefly, the invention relates to a method and apparatus for enhancing the operation of the spanning tree protocol. An intermediate network device, such as a switch or bridge, includes an enhanced spanning tree entity that is configured to execute a spanning tree protocol. The enhanced spanning tree entity, which includes an extractor module and a state machine engine, performs a plurality of novel functions that improve the execution and performance of the spanning tree protocol. First, the enhanced entity identifies loop-back ports. More specifically, the enhanced spanning tree entity examines the configuration bridge protocol data unit (BPDU) messages that are received and determines, among other things, whether these received BPDUs are identical to the BPDUs forwarded on those ports. If so, the enhanced entity detects the presence of a loop-back cable or configuration and transitions the respective port to the blocking state to prevent message proliferation.

In another aspect of the invention, the enhanced spanning tree engine includes a method for transitioning certain ports directly to a forwarding state to prevent associated applications from timing out. More specifically, one or more ports of the device can be configured as access ports. Normally, an access port is only coupled to a specific entity (e.g., a server or end station) or a LAN and does not provide connectivity to other portions or segments of the computer network. Thus, BPDU messages are not received on access ports (unless there is a loop-back condition). In accordance with the invention, one or more access ports may be also be configured as "rapid forwarding". Upon initialization, the enhanced spanning tree entity preferably examines the configuration of each port. If a port is configured as an access port with rapid forwarding, then the entity preferably causes that port to transition directly to the forwarding state. That is, the enhanced spanning tree entity by-passes the conventional blocking, listening and learning states and instead, places the port immediately in the forwarding state. Messages can thus be forwarded to and from the port right away. Since this function is only to be enabled on access ports (which would eventually become designated ports), loops are unlikely to result.

BRIEF DESCRIPTION OF THE DRAWINGS

The above and further advantages of the invention may be better understood by referring to the following description in conjunction with the accompanying drawings, in which.

DETAILED DESCRIPTION OF THE PREFERRED EMBODIMENT

Figure 1:
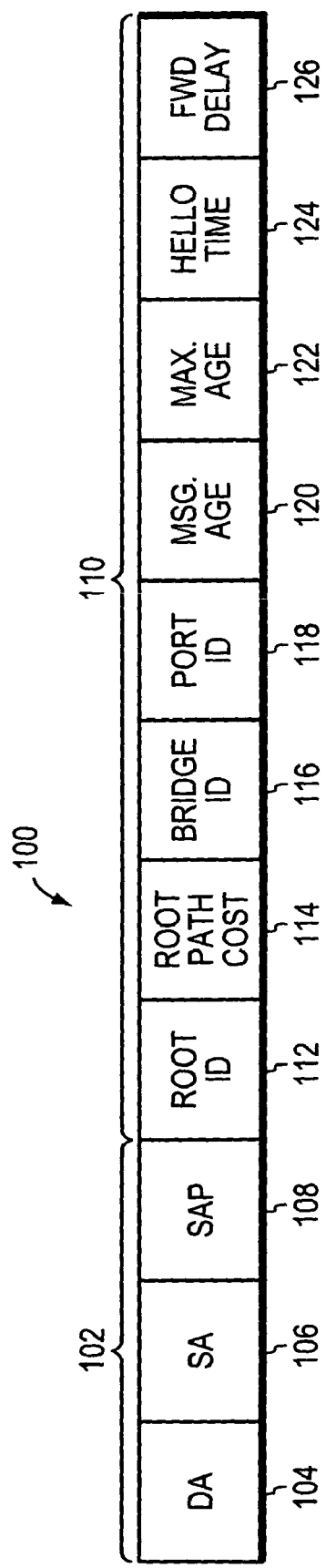
FIG. 1, previously discussed, is a block diagram of a conventional configuration bridge protocol data unit (BPDU) message.
Figure 2:
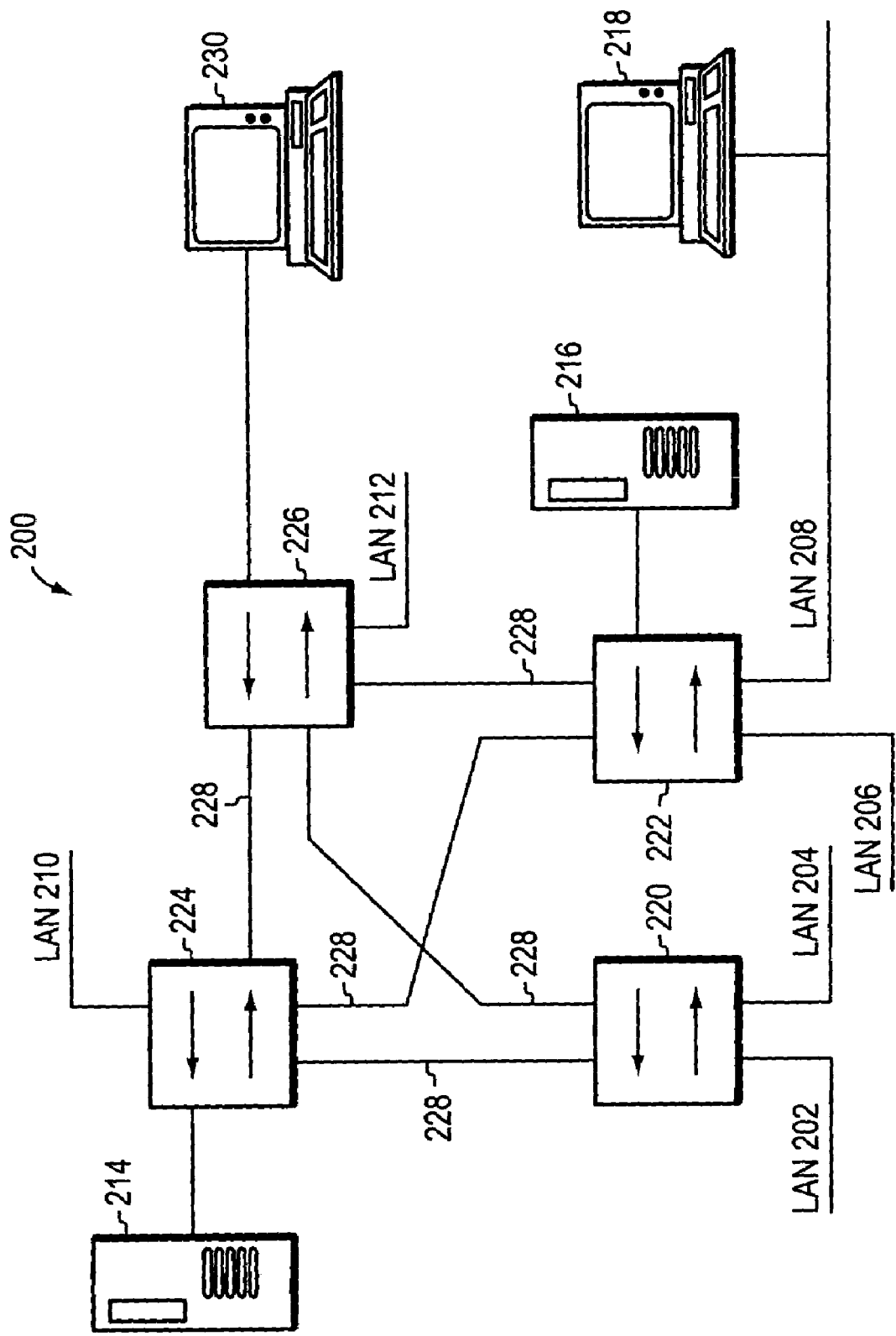
FIG. 2 is a highly schematic diagram of a computer network in accordance with the present invention.

FIG. 2 illustrates a computer network 200 in accordance with the present invention. The network 200 preferably comprises a plurality of local area networks (LANs) 202-212 and servers 214, 216, such as file servers, print servers, etc. Attached to the LANs 202-212 are one or more hosts or end stations, such as end station 218, that may source or sink data frames over the network 200. That is, LANs 202-212 and servers 214, 216 are preferably coupled to one or more intermediate network devices, such as switches 220-226. Switches 220-226, in turn, may be interconnected through a series of links 228, such as point-to-point links or trunks. More specifically, each switch 218-224 includes a plurality of ports that are coupled to corresponding LANs, servers, end stations and trunk links, and each port may be identified by a corresponding port number (e.g., port 1, port 2, port 3, etc.) Switches 220-226 are thus able to associate specific ports with the LANs, switches, servers, etc. that are coupled thereto or otherwise accessible through a given port.

It should be understood that the network 200 of FIG. 2 is meant for illustrative purposes only and that the present invention will operate with other, possibly far more complex, network designs having multiple network components, such as end stations, servers, LANs, bridges, switches, routers, gateways, etc. For example, an end station, such as end station 230, may be connected directly to a switch, such as switch 224.

As shown, network 200 includes a plurality of redundant communication paths. The existence of such redundant paths prevents portions of the network 200 from becoming isolated should any constituent link or intermediate network device fail. Such redundancy, however, also results in the creation of loops, which, as described above, are highly undesirable. To avoid the creation of loops, switches 220-226 preferably execute a spanning tree protocol. However, as described herein, the spanning tree protocol executed by switches 220-226 is preferably enhanced in a novel manner to provide greater functionality and improve network performance.

Figure 3:
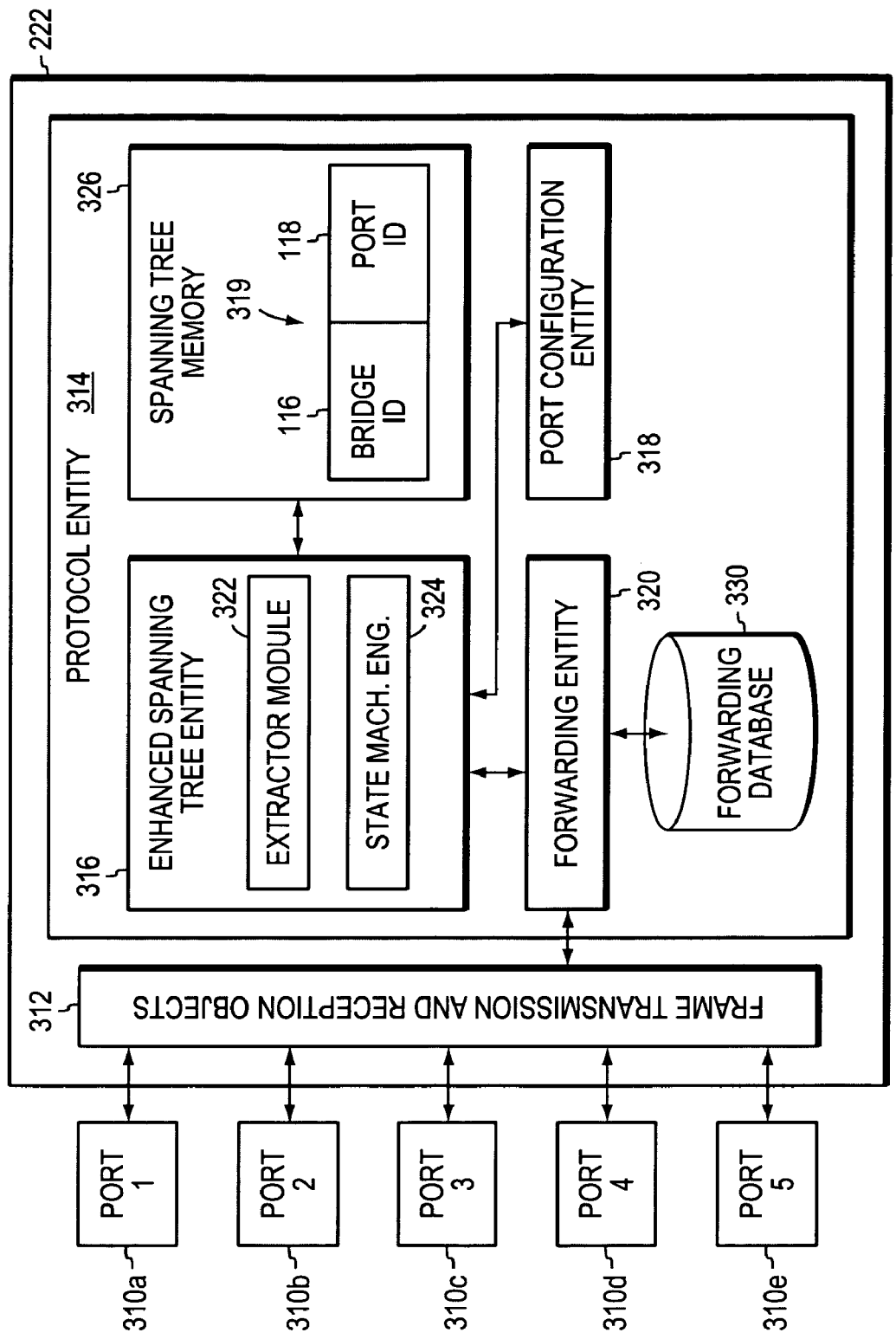
FIG. 3 is a partial block diagram of an intermediate network device in accordance with a preferred embodiment of the present invention.

FIG. 3 is a partial block diagram of switch 222 in accordance with the present invention. A switch suitable for use with the present invention is described in commonly owned U.S. Pat. No. 5,742,604 to Edsall, et al. for INTERSWITCH LINK MECHANISM FOR CONNECTING HIGH PERFORMANCE NETWORK SWITCHES, which is hereby incorporated by reference in its entirety. Switch 222 includes a plurality of ports 310a-310e each of which is preferably identified by a number (e.g., port numbers 1 through 5). One or more frame transmission and reception objects, designated generally 312, are associated with the ports 310 such that data frames received at a given port 310 may be captured and frames to be transmitted by switch 222 may be delivered to a given port 310. Frame reception and transmission objects 312 are preferably message storage structures, such as priority queues. In the illustrated embodiment, switch 222 is a computer having transmitting and receiving circuitry and components, including one or more network interface cards (NICs) establishing ports for the exchange of data frames, one or more central processing units (CPUs) and associated memory devices for performing calculations and one or more bus structures.

Switch 222 further includes a protocol entity 314 comprising a plurality of components. In particular, the protocol entity 314 includes at least one enhanced spanning tree entity 316, at least one port configuration entity 318 and at least one forwarding entity 320. The enhanced spanning tree entity 316 includes an extractor module 322 and a state machine engine 324 for modifying the states of ports 310. The spanning tree entity 316 is preferably coupled to a corresponding spanning tree memory 326 that includes a plurality of records or cells (not shown) for storing information or parameters relating to a spanning tree algorithm, including the unique, numeric switch identifier (ID) corresponding to switch 222, the assigned path cost corresponding to each port 310a-e and the hello time, maximum age and forward delay parameters. Memory 326 also includes a plurality records or cells (not shown) for storing the "best" BPDU information known for each port 310a-e, including a message age field 120 that may be incremented by the enhanced spanning tree entity 316. Memory 326 further includes one or more loop-back detection data structures 328, as described below.

The forwarding entity 320 is in communicating relation with the frame transmission and reception objects 312 and is coupled to a forwarding database 330 that stores address information corresponding to the entities of network 200 (FIG. 2). Specifically, filtering database 330 has a plurality of records or cells (not shown), including a destination address cell, a destination port cell and a corresponding timer cell. Each record or cell in the filtering database 330 preferably corresponds to a particular network entity. The forwarding entity 320 is configured to switch or bridge data frames from a source port 310 to one or more destinations ports 310 depending on information contained in the forwarding database 320 and also on the states of the respective ports 310 as managed by the state machine engine 324. Forwarding entity 320 also relays BPDU messages between ports 310 and the enhanced spanning tree entity 316 with which it is in communicating relation.

It will be understood to those skilled in the art that memory 326 and forwarding database 330 may be implemented as a content addressable memory (CAM) devices and that enhanced spanning tree entity 316, port configuration entity 318 and forwarding entity 320 may each comprise registers and combinational logic configured and arranged to produce sequential logic circuits. In the illustrated embodiment, entities 316, 318 and 320 preferably comprise programmable processing elements containing software programs pertaining to the methods described herein and executable by the processing elements. Other computer readable media may also be used to store and execute the program instructions.

In operation, the enhanced spanning tree entity 316 formulates BPDU messages for transmission on ports 310a-e, processes received BPDU messages and stores BPDU parameters generally in accordance with the spanning tree protocol as specified in the IEEE 802.1D Bridge standard, which is hereby incorporated by reference in its entirety. Entity 316 also includes additional, novel components and functions that may be implemented to improve the performance of the spanning tree protocol, as described below. In particular, enhanced spanning tree entity 316 is configured and arranged to detect and block self-looping ports and to transition certain predefined ports directly to the forwarding state. In the preferred embodiment, the enhanced spanning tree entity 316 is additionally configured and arranged to identify when a link is congested and, in response, to delay transition of the corresponding port from the blocking state. The enhanced spanning tree entity 316 of the preferred embodiment also re-calculates the active topology only in response to BPDU messages containing information likely to result in a change in port states.

Rapid Forwarding

Referring to FIGS. 2 and 3, assume that port 310a (i.e., port 1) of switch 222 is coupled to server 216 and that port 310b (i.e., port 2) is coupled to LAN 208 with end station 218. Further, assume that an application running on end station 218 must establish communication with server 216 within in a short period of time to keep from timing out and shutting down. Execution of the conventional spanning tree protocol typically requires approximately 30 seconds or more for both ports 1 and 2 to transition to forwarding. More specifically, upon initialization of switch 222 and receipt of a link-up signal, ports 1 and 2 are placed in the learning state and begin transmitting BPDU messages. If no "better" BPDU messages or no BPDU messages are received at either port within the default time (e.g., 15 seconds), each port transitions to the learning state. Here, the ports wait another 15 seconds before finally transitioning to the forwarding state. By this time, the application at end station 218 is likely to have timed out and shut down. As described below, the enhanced spanning tree entity 316 includes one or more novel mechanisms for solving this problem.

First, one or more ports 310 of switch 222 are configured as access ports by a network administrator. An access port is a switch port 310 that does not provide connectivity to other portions of the bridged network, but is instead simply connected to a LAN, a server or an end station. Considering switch 222, ports 310a (port 1), port 310b (port 2) and port 310c (port 3) which are coupled to server 216 and LAN 208 and LAN 206, respectively, may be configured as access ports. The configuration of various ports as access ports may be performed by the network administrator utilizing a management protocol, such as Simple Network Management Protocol (SNMP) or CiscoWorks from Cisco Systems, Inc., either remotely or locally. The designation of a port as an access port is preferably maintained by the port configuration entity 316 in a conventional manner. The network administrator may further configure one or more access ports as "rapid forwarding". As described below, by configuring a port as rapid forwarding, the network administrator allows that port to be transitioned directly to the forwarding state upon initialization of the respective switch. Again, any conventional network configuration methods such as SNMP or CiscoWorks may be used and the designation of an access port as rapid forwarding is similarly maintained by the port configuration entity 318.

Figure 4:
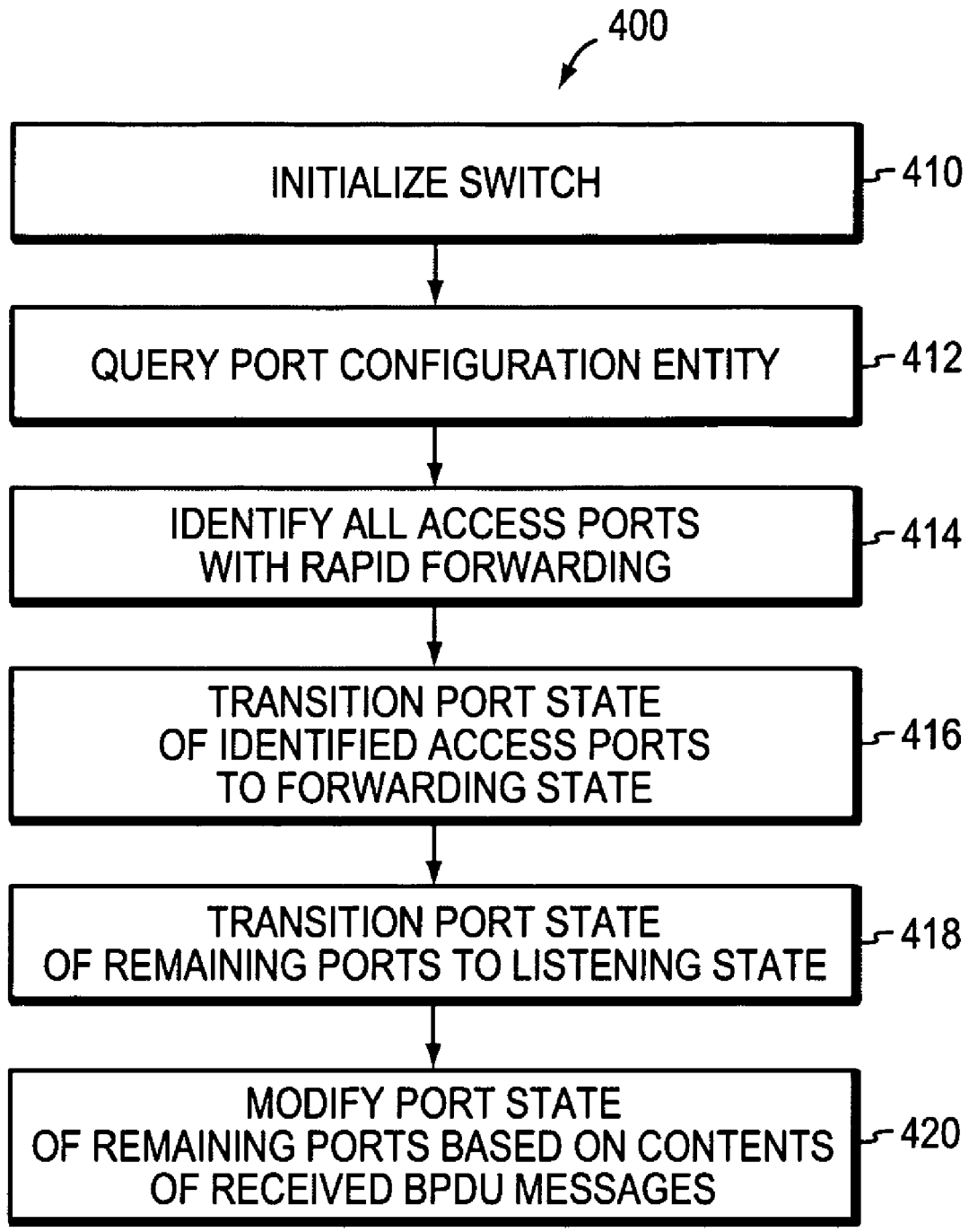
FIGS. 4-7 are flow diagrams of the preferred methods of the present invention.

FIG. 4 is a flow diagram of the preferred method 400 for implementing rapid forwarding. First, switch 222 is initialized, as indicated at block 410. Next, the enhanced spanning tree entity 316 queries the port configuration entity 318 to determine whether switch 222 has been configured with any access ports and, if so, whether any of these access ports are also configured for rapid forwarding, as indicated at block 412. In response, the port configuration entity 318 examines its associated memory and identifies all ports configured as access ports with rapid forwarding, as indicated at block 414. For example, port configuration entity 318 may reply to entity 316 that port 310*a* (port 1 which is coupled to server 216) and port 310*b* (port 2 which is coupled to LAN 208) are both access ports with rapid forwarding.

Next, the enhanced spanning tree entity 316 directs its state machine engine 324 to transition the identified ports (e.g., ports 1 and 2) directly to the forwarding state, as indicated at block 416. More specifically, rather than starting the port in the listening state, transmitting BPDU messages and waiting to examine and process any BPDU messages that might be received, as required by the conventional spanning tree protocol, the enhanced spanning tree entity 316 of the present invention causes these ports to transition directly to the forwarding state. The ports do not pass through any of the blocking, listening or learning states. Indeed, enhanced spanning tree entity 316 preferably directs engine 324 to transition these rapid forwarding ports to the forwarding state even before a corresponding link up signal from the physical layer of the corresponding communication standard has been received. In the conventional spanning protocol, a port is not even placed in the listening state until such a link up signal is received. Here, the enhanced spanning tree entity 316 preferably proceeds to transition the designated access ports without waiting for a link-up signal, essentially providing "0" seconds forwarding. Preferably, the rapid forwarding ports also begin transmitting BPDU messages.

As a result, switch 222 may forward messages to and from these ports immediately. In particular, with ports 1 and 2 in the forwarding state, the application at end station 218 may immediately begin sending messages to and receiving messages from server 216, preventing the application from shutting down prematurely. Next, the enhanced spanning tree entity 316 preferably transitions its remaining ports to the listening state, as indicated by block 418, in response to corresponding link up signals. These remaining ports are then moved between the blocking, learning and forwarding states according to the conventional spanning tree protocol, as indicated at block 420. For example, the enhanced spanning tree entity 316 examines and processes BPDU messages, if any, received at these ports and modifies the respective port states accordingly.

As shown, operation of the enhanced spanning tree entity 316 allows ports coupled to devices running or associated with time-sensitive applications to be immediately placed in the forwarding state. This helps prevent such applications from timing out and shutting down.

It should be understood that an access port with rapid forwarding may be placed in the forwarding state as described above whether or not any LAN, server or end station(s) is actually coupled to the port. That is, it is not necessary that such ports be coupled to any end stations, LANs or servers. So long as the port is configured as an access port with rapid forwarding, the enhanced spanning tree entity 316 immediately transitions the port to the forwarding state upon initialization of the switch. Accordingly, if a device is subsequently connected to the port (or an application on a device already connected to the port is subsequently started), the device (or application) may begin sending and receiving messages immediately.

If the enhanced spanning tree entity 316 receives a BPDU message 100 on an access port with rapid forwarding, it should process the contents of the received BPDU message according to the conventional spanning tree protocol. In particular, the receipt of a BPDU message indicates that the port has connectivity to the bridged network (or the port is self-looping). To avoid the existence of loops in such situations, state machine engine 324 preferably transitions the port among the blocking, listening, learning and forwarding states as provided by the convention spanning tree protocol. Entity 316 may also cause an error or misconfiguration message to be sent to the network administrator, indicating that this rapid forwarding port may have connectivity to the bridged network.

In the preferred embodiment, the rapid forwarding method 400 of FIG. 4 is implemented in software as a series of steps executed by the enhanced spanning tree entity 316. Nonetheless, it should be understood that the method may be implemented, either wholly or in part, through computer hardware implementations.

Detection of Loop-Back Ports

In a further embodiment of the invention, the enhanced spanning tree entity 316 also detects the presence of loop-back ports. As described above, ports can be configured to operate in a loop-back mode. Additionally, some network cabling or link configurations cause messages that are forwarded onto the corresponding cable or link to be looped back to the originating port. Even though such conditions can result in the creation of loops, the prior art spanning tree protocol is generally unable to either detect or correct such problems.

Figure 5:
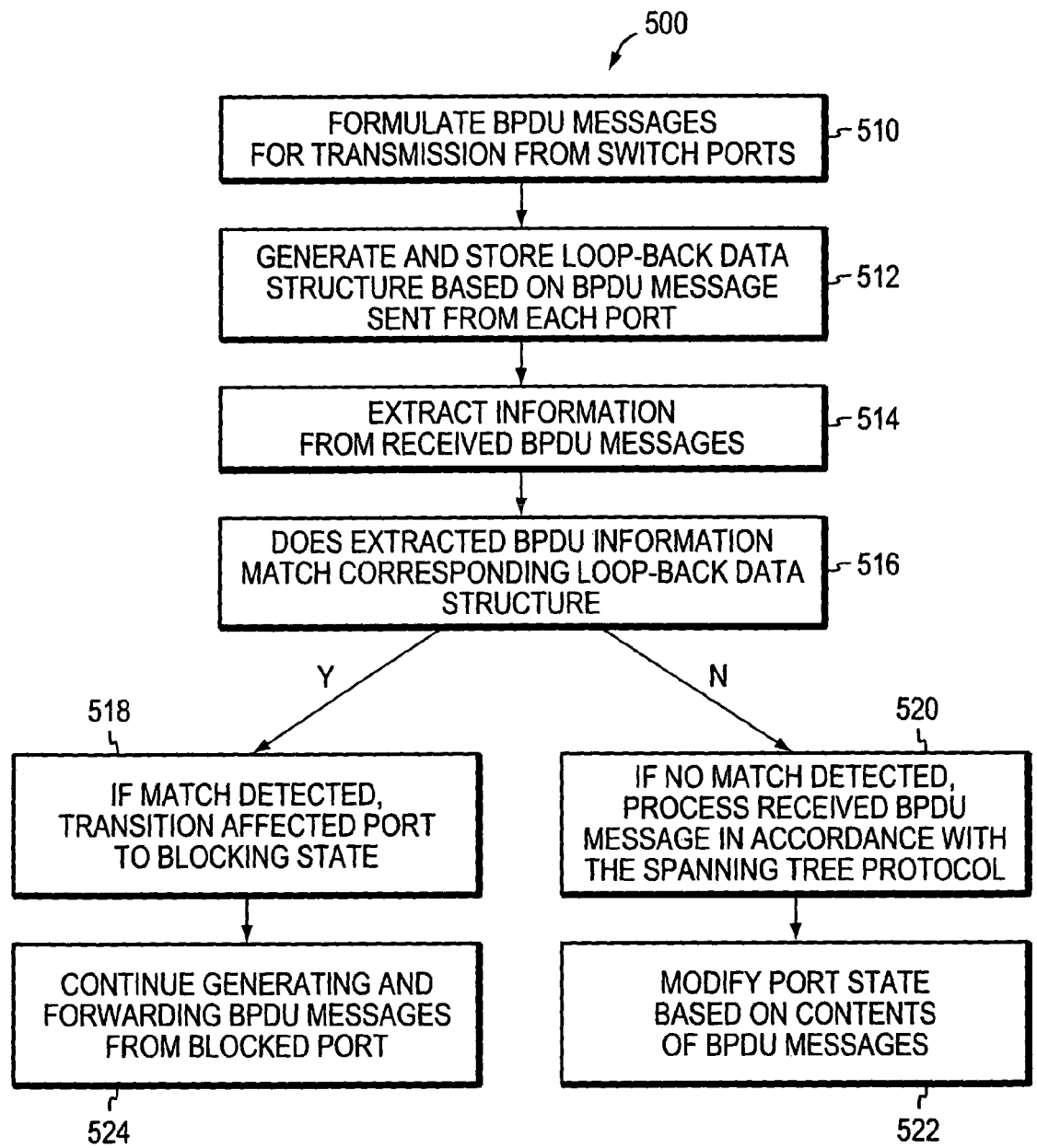

FIG. 5 is a flow diagram of the preferred steps 500 corresponding to the loop-back detection feature of the present invention. In particular, as indicated at block 510, the enhanced spanning tree entity 316 generates BPDU messages 100 for transmission from one or more ports 310 in accordance with the conventional spanning tree protocol. Next, the enhanced spanning tree entity 316 generates a loop-back data structure 319 (FIG. 3) comprising copies of at least the bridge identifier (ID) field 116 and the port identifier (ID) field 118 from the BPDU message 100 forwarded from each port 310*a*-310*e*, as indicated at block 512. That is, a loop-back detection data structure 319 is preferably generated for each port 310 through which a corresponding BPDU message 100 is transmitted. The loop-back data structures 319, which may be the same BPDU data structure stored for the respective port or a separate structure, is preferably stored at the spanning tree memory 320.

Next, as BPDU messages 100 are received at one or more ports 310*a*-*e*, information is extracted therefrom by the extractor module 322 of the enhanced spanning tree entity 316, as shown at block 514. Preferably, extractor module 322 extracts at least the contents of the bridge ID field 116 and the port ID field 118 from the received BPDU message 100. This extracted information is then compared by the enhanced spanning tree entity 316 with the corresponding loop-back data structure 319, as indicated at block 516. More specifically, the entity 316 includes one or more comparator modules that compares the bridge ID field 116 and the port ID field 118 from the received BPDU message 100 with the corresponding fields of the respective loop-back detection data structure 319, which, as described above, was derived from the BPDU message forwarded from that port. If the enhanced spanning tree entity 316 detects a match between the extracted information and the corresponding loop-back detection data structure 319 (i.e., both the bridge ID and the port ID from the received BPDU message are the same as the bridge ID and port ID fields 116, 118 from the corresponding loop-back detection data structure 319), as indicated at block 518, entity 316 directs state machine engine 324 to transition the respective port to the blocking state. With the port in the blocking state, switch 222 neither forwards data frames to or from the port. If a match is not detected between the extracted information and the corresponding loop-back detection data structure 319 (e.g., either the bridge ID or the port ID of the received BPDU message 100 differ from those data elements contained in the corresponding loop-back data structure 319), then the enhanced spanning tree entity 316 simply processes the contents of the received BPDU message 100, as indicated at block 520, and modifies the respective port state in accordance with the conventional spanning tree protocol, as indicated at block 522. For example, the received BPDU message 100 may be compared with the "best" information currently known by entity 316.

For ports placed in the blocking state as a result of step 518, the enhanced spanning tree entity 316 continues to generate and transmit BPDU messages 100 from these ports, as indicated at block 524. By continuing to send BPDU messages (and presumably receive the same BPDU messages back), these loop-back ports are kept in the blocking state. As shown, the present invention is able to detect and block loop-back ports, thereby preventing the creation of otherwise undetected loops.

It should be understood that the loop-back detection data structure 319 may include additional data elements from the transmitted BPDU message, besides the bridge ID field 116 and port ID field 118, and these additional elements may also be used for subsequent comparison. For example, loop-back detection data structure 319 may include, and spanning tree entity 316 may also consider, the root ID field 112, the root path cost field 114, and/or any of fields 120-126 from the BPDU message sent from a given port 310. It should further be understood that, if the transition of a loop-back port results in a loss of connectivity to some portion of the network 200, the network administrator should be notified in order to correct the situation. In the preferred embodiment, the loop-back detection method 500 is preferably implemented in software as a series of steps executed by the enhanced spanning tree entity 316, although a hardware solution could also be implemented.

Congestion or Oversubscription Detection

As mentioned above, if a network link becomes congested or oversubscribed, BPDU messages may be discarded prior to transmission. Furthermore, if a downstream switch stops receiving BPDU messages on a blocked port, it may conclude, based on execution of the conventional spanning tree protocol, that the port should become a designated port or the root port and, in response, transition the port to the forwarding state. Nonetheless, with the port at the upstream switch still in the forwarding state, a loop may result that only exacerbates the congestion. As described below, the enhanced spanning tree entity 316 of the present invention preferably includes a mechanism for detecting such congestion problems and avoiding the formation of loops.

Figure 6:
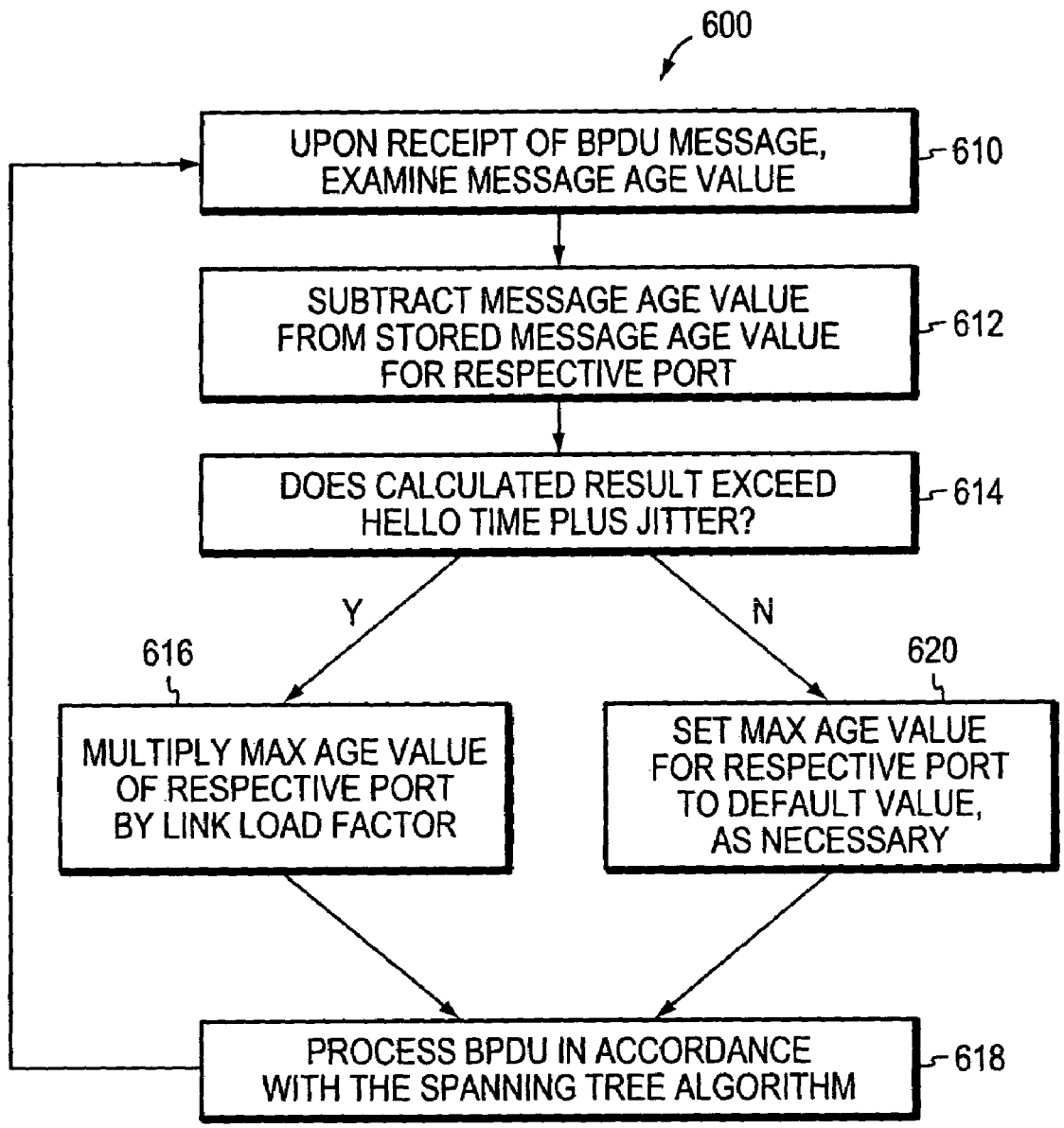

FIG. 6 is a flow diagram of the steps 600 corresponding to the congestion detection feature of the present invention. First, upon receipt of a BPDU message 100, the enhanced spanning tree entity 316 extracts and examines the contents of the message age field 120, as indicated at block 610. Next, the enhanced spanning tree entity 316 subtracts the message age value of the received BPDU message 100 from the message age value of the BPDU information currently stored for that port, as indicated at block 612. The enhanced spanning tree entity 316 then determines whether this calculated value (i.e., the value from step 612) exceeds the hello time, including any jitter, currently associated with the respective port, as indicated at block 614. Jitter refers to the variation in end-to-end message transit time. The enhanced spanning tree entity 316 may be pre-configured with a default jitter parameter for network 200.

If the calculated value exceeds the hello time plus jitter, then the switch "knows" that BPDU messages are not being received at the expected rate and that congestion or oversubscription may exist. In response, the enhanced spanning tree entity 316 preferably increases the value of the respective maximum age threshold to prevent the stored BPDU information for this port 310 from being timed out due to the existence of congestion or over-subscription. More specifically, as indicated at block 616, the enhanced spanning tree entity 316 preferably multiplies the maximum age threshold value utilized the respective port by a "link load factor". The magnitude of the link load factor is preferably selected to accommodate the level of congestion or over-subscription being experienced on the subject link.

In the preferred embodiment, the link load factor is 5. That is, the maximum age threshold (which, according to the IEEE 802.1D standard, may be in the range of 6-40 seconds with a recommended default value of 20 seconds) is preferably increased by a factor of 5. By essentially increasing the value of the maximum age threshold (e.g., from 20 to 100 seconds), the enhanced spanning tree entity 316 prevents the stored BPDU information from being discarded too hastily. After modifying the corresponding maximum age value, the enhanced spanning tree entity 316 preferably proceeds in a conventional manner as reflected by block 618.

If the calculated value from step 614 is less than or equal to the hello time plus jitter, then the switch 222 "knows" that BPDU messages are being received at the expected rate and that no change in the corresponding maximum age threshold is warranted. Accordingly, the enhanced spanning tree entity 316 preferably returns or simply maintains the maximum age threshold associated with this port 310 at the default value or as specified in field 122 of the received BPDU message 100, as indicated at block 620. Entity 316 then proceeds to process the received BPDU message 100, as indicated by block 618, and to modify its port states as required.

In the preferred embodiment, rather than determine whether BPDU messages are being received at the expected rate, the enhanced spanning tree entity 316 waits until 5 consecutive BPDU messages are lost before modifying the maximum age value of the respective port by the link load factor. More specifically, entity 316 first calculates how long it should take to receive 5 consecutive BPDU messages 100 based on the hello time as specified by the root in field 124 of a received BPDU message 100 (e.g., 10 seconds for a hello time of 2 seconds). Enhanced spanning tree entity 316 may initiate a timer upon receipt of each BPDU message 100. If the time between receipt of any two consecutive BPDU messages for a given port 310 exceeds this value (e.g., 10 seconds) or if no BPDU messages are received after this amount of time has elapsed, then the enhanced spanning tree entity 316 "knows" that at least 5 consecutive BPDU messages 100 have been lost and, in response, modifies the maximum age value associated with the respective port by the link load factor, as described above.

It should be understood that the maximum age threshold is preferably only modified during periods of congestion or over-subscription. That is, as BPDU messages are once again received at the expected rate for a given port, the enhanced spanning tree entity 316 returns the corresponding maximum age threshold to its default value, as indicated at block 620. It should be further understood that the maximum age threshold is preferably adjusted on a port-by-port basis.

It should be further understood that if an inferior BPDU message 100 is received at a given port 310, the maximum age value associated with the given port is returned to the default value as specified by the root in BPDU message field 122.

Optimization of BPDU Message Processing

As indicated above, a conventional switch proceeds to re-calculate is port states (i.e., re-determine the root, root path cost and root port) in response to two conditions: first, if a received BPDU message has better information, including a smaller message age, than that currently stored for the respective port; or second, if the stored BPDU information times out and is discarded. These calculations, moreover, can consume significant processor resources and time. Furthermore, if the received BPDU message is otherwise identical as compared with the stored BPDU information, except for the smaller message age time (e.g., same assumed root and root path cost), then no change in port states will result, despite recalculation of the root, root path cost and root port by the conventional switch. This routinely occurs as the active topology nears convergence and once it reaches convergence. As explained below, the enhanced spanning tree entity 316 of the present invention preferably includes a mechanism that conserves processor resources by re-calculating the root, root path cost and root port only when it is likely to result in a change in port state.

Figure 7A:
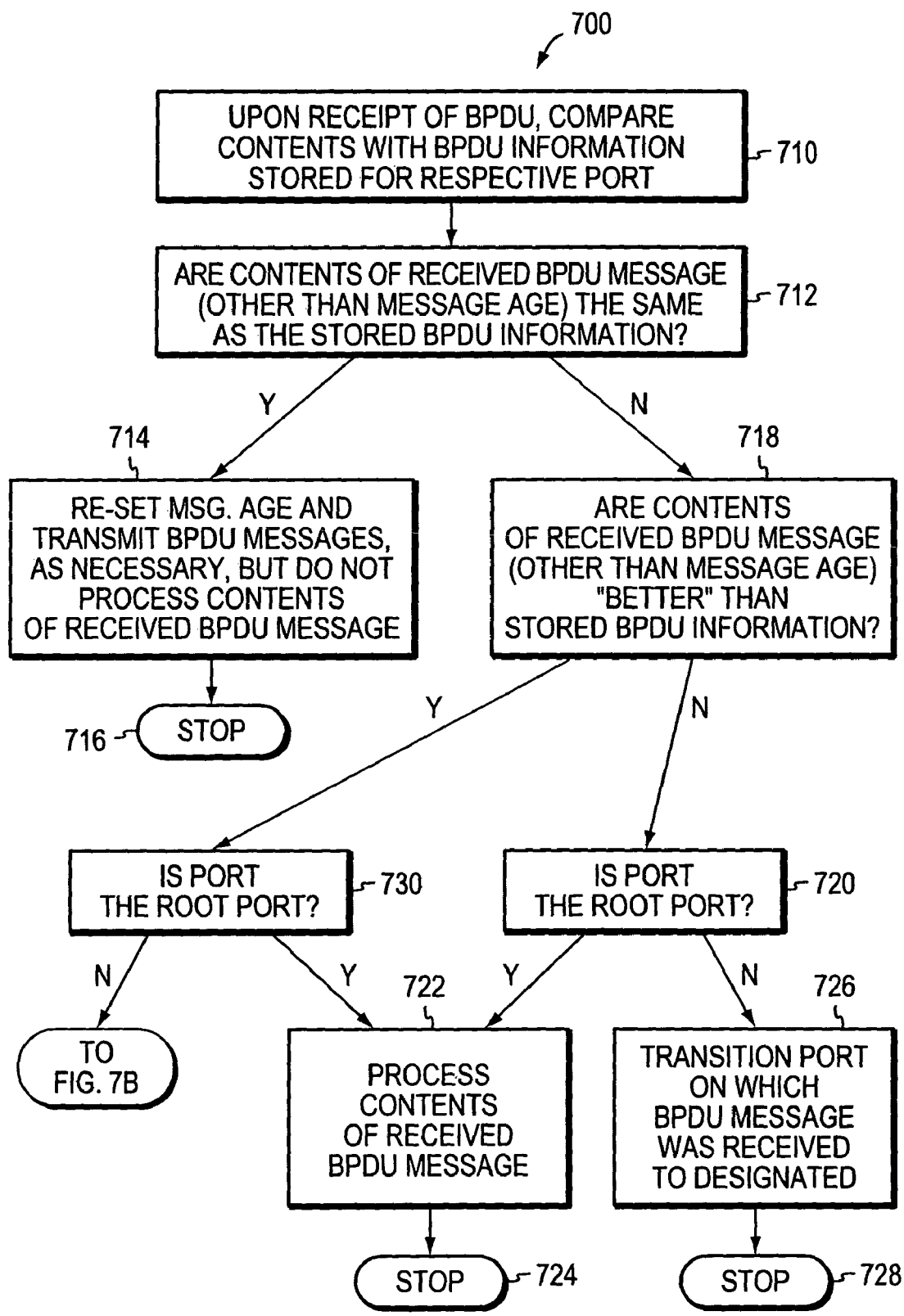
Figure 7B:
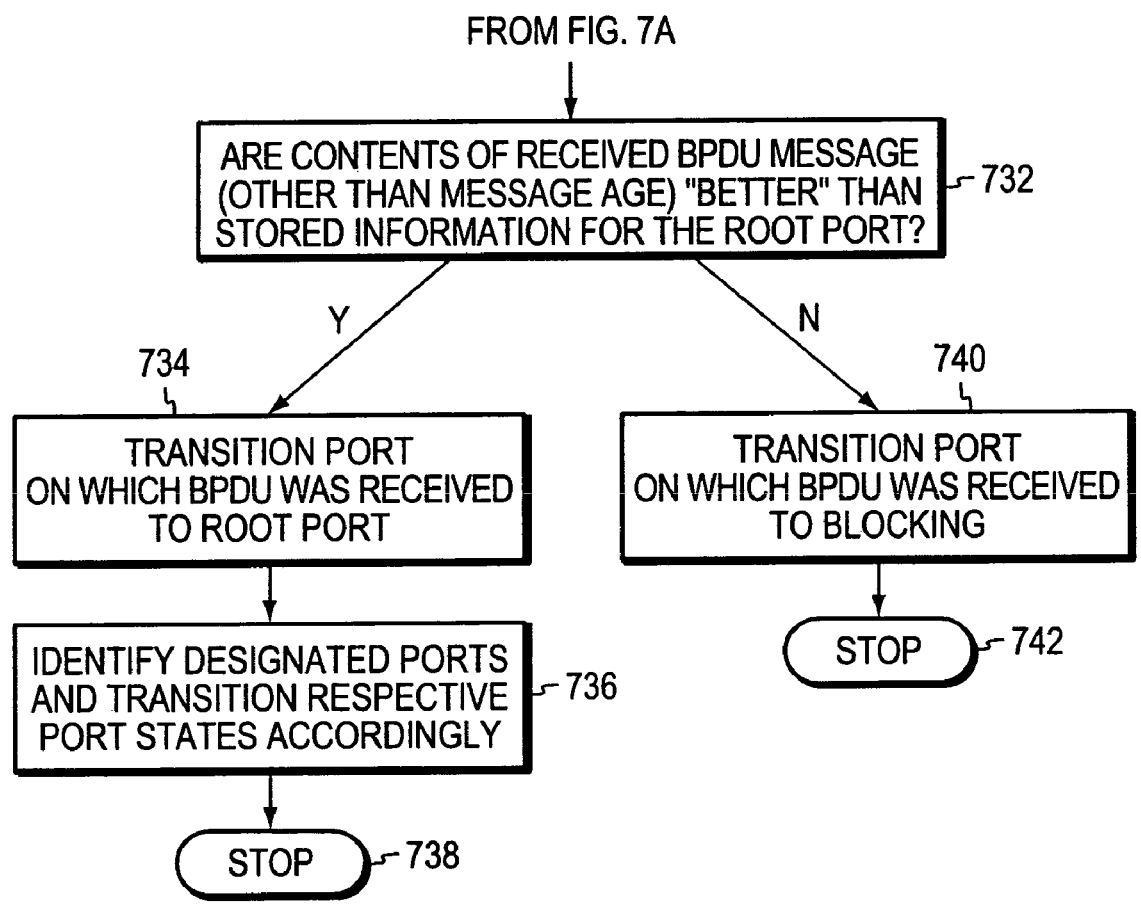

FIGS. 7A-7B are flow diagrams of the preferred steps 700 for implementing the spanning tree optimization technique of the present invention. In particular, upon receipt of a BPDU message 100 at a given port 310, the enhanced spanning tree entity 316 examines the contents of the message 100, as indicated at block 710. More specifically, the enhanced spanning tree entity 316 examines at least the contents of the root identifier field 112 and root path cost field 114. It should be understood that other fields may also be examined, such as the bridge ID field 116, the port ID field 118, the maximum age field 122 or the hello time field 124, for example. Next, the enhanced spanning tree entity 316 determines whether the contents of the examined fields are the same as the BPDU information stored for the respective port, as indicated at block 712. At this point, the entity 316 does not compare message age values, since the received BPDU message 100 is likely to contain a different message age than that stored for the respective port 310.

If the examined contents are the same as the stored information, then the enhanced spanning tree entity 316 "knows" that re-calculating the root, root path cost and root port will not result in a change of port states. That is, the assumed root and root path cost from the received BPDU message 100 correspond to the "best" BPDU information presently know by entity 316. Accordingly, rather than waste processor resources, the entity 316 preferably does not perform such calculations. Instead, the enhanced spanning tree entity 316 simply adopts the contents of the message age field 120 from the received BPDU message 100 (assuming it is smaller) and proceeds to transmit BPDU messages 100 from its designated ports, as indicated at block 714, completing this portion of the process 700, as indicated by block 716.

If the examined contents from the received BPDU message 100 are different from the stored BPDU information (e.g., different assumed root or root path cost), the enhanced spanning tree entity 316 "knows" that recalculating the root, root path cost and root port may result in a change of port states.

Accordingly, the enhanced spanning tree entity 316 preferably proceeds first to determine whether the contents of the received BPDU message 100 are "better" than the BPDU information stored for the respective port 310 on which the subject BPDU message was received (e.g., received BPDU message has lower root or root path cost), as indicated at block 718. If not, entity 316 next determines whether the respective port 310 is the current root port for the switch 222, as shown at block 720. If this BPDU message, which does not contain information that is "better" than that currently stored for the respective port 310, was nonetheless received on the root port, then the enhanced spanning tree entity 316 "knows" that it may need to identify a new root port. Accordingly, entity 316 processes the contents of the received BPDU message and recalculates the root, root path cost and root port in accordance with the conventional spanning tree protocol, as shown at block 722. Following step 722, this portion of the process 700 is complete, as indicated at block 724.

If the port on which this BPDU message (which does not contain information that is "better" than that currently stored for the respective port 310) was received is not the current root port for switch 222, then "entity" knows that this port 310 should be a designated port. Accordingly, entity 316 preferably causes the respective port 310 to transition to the forwarding state, as indicated at block 726. With the port 310 converted to a designated port, this portion of the process 700 is complete, as indicated by block 728.

Returning to the determination made at block 718, if the contents of the received BPDU message are "better" (e.g., lower root or root path cost, etc.) than the currently stored BPDU information, entity 316 again determines whether the port 310 on which the BPDU was received is the root port, as shown at block 730. If it is, then entity 316 "knows" that although this port is likely to remain the root port, its current configuration of designated ports may change. As a result, entity 316 preferably processes the contents of the received BPDU message and re-calculates the root, root path cost and root port, as described above with reference to block 722.

If the port 310 on which this BPDU message, which contains "better" information than that currently known for this port, was not received on the root port, entity 316 preferably compares the contents of the received BPDU message with the BPDU information for its root port, as indicated at block 732 (FIG. 7B). That is, entity 316 proceeds to determine whether the information from the received BPDU message, which is better than the BPDU information for the port on which it wars received, is also better than the "best" (i.e., root port) BPDU information for switch 222. If it is, then entity "knows" that the port on which this BPDU message was received should become the new root port for switch 222. Accordingly, entity 316 preferably transitions the port 310 on which this BPDU message was received to forwarding, as indicated at block 734, and determines which of its remaining ports 310 (including the former root port) should become designated or blocked ports in accordance with the conventional spanning tree protocol, based on the new BPDU information, as indicated at block 736. This completes this portion of the process 700, as indicated at block 738.

Returning to step 732, if the contents of the received BPDU message are not "better" than the information stored for the root port, then entity 316 "knows" that the device which transmitted this BPDU message represents a better path to the root for this port (and corresponding LAN, if any), but it does not represent a better overall path to the root for switch 222. As a result, entity 316 preferably transitions the port 310 on which this BPDU message was received to the blocking state, as indicated by block 740, thereby completing the process 700, as indicated at block 742.

As shown, the entity 316 is able to conserve considerable processor resources by avoiding the processing of BPDU messages 100 when no change in port states will occur. Furthermore, by comparing the contents of a received, non-similar BPDU message first with the BPDU information for the port at which the message was received and then, if necessary, with the information for the root port, entity 316 can determine whether the state of the port on which this BPDU message was received can be changed (e.g., converted to a designated port or to a blocked port) without having to run the spanning tree algorithm for all switch ports 310. This further conserves processor resources by only running the spanning tree algorithm when it may result in a change to more than the port on which the BPDU message was received.

In the preferred embodiment, steps 700 are implemented in software, although hardware solutions may also be utilized.

It should be understood that the previously described functions 400, 500, 600 and 700 of the enhanced spanning tree entity 316 may be implemented singly or in any combination.

It should be further understood that the foregoing enhancements to the spanning tree protocol may be implemented in computer networks supporting virtual local area networks (VLANs). In a VLAN compatible network, various LANs, end stations, servers or network segments may be virtually segregated into a series of network groups by associating switch or other device ports with various VLAN designations. Suitable VLAN arrangements are described in IEEE draft standard 802.1Q for Virtual Bridged Local Area Networks and in U.S. Pat. No. 5,394,402 to Ross for a HUB FOR SEGMENTED VIRTUAL LOCAL AREA NETWORK WITH SHARED MEDIA ACCESS. In VLAN compatible networks, a single spanning tree or active topology may be defined for the entire bridged network, including all VLAN designations. Alternatively a separate spanning tree or active topology may be defined for each VLAN designation. In a third alternative, as described in commonly owned U.S. patent application Ser. No. 08/997,297 filed Dec. 23, 1997 for a SHARED SPANNING TREE PROTOCOL, a plurality of spanning trees may be shared among one or more VLAN designations. It should be understood that the present invention is compatible with each of the foregoing spanning tree solutions.

The foregoing description has been directed to specific embodiments of this invention. It will be apparent, however, that other variations and modifications may be made to the described embodiments, with the attainment of some or all of their advantages. For example, the present invention applies equally to BPDU messages compliant with the IBM Token Ring Architecture as well as the IEEE 802.1D Bridge standard. Therefore, it is the object of the appended claims to cover all such variations and modifications as come within the true spirit and scope of the invention.

What is claimed is:

1. A computer readable medium containing executable program instructions for use by an intermediate network device having a plurality of ports for receiving and forwarding network messages, the executable program instructions comprising program instructions for:
    configuring one or more ports as access ports;
    configuring one or more access ports as rapid forwarding ports;
    identifying all ports that have been configured as access ports with rapid forwarding; and
    upon initialization of the device, placing each identified access port with rapid forwarding directly to a forwarding spanning tree port state, without transitioning such identified ports between any intermediary spanning tree port states, so that network messages may be received and forwarded by such identified ports immediately;
    wherein each access port configured with rapid forwarding is placed in the forwarding state prior to a physical layer link-up signal being received at the respective port.

2. The computer readable medium of claim 1 wherein the executable program instructions further comprise program instructions for:
    monitoring each of the one or more access ports configured with rapid forwarding for receipt of a configuration bridge protocol data unit (BPDU) message; and
    in response to receiving a BPDU message at one of the access ports configured with rapid forwarding, placing the respective access port in a blocking spanning tree port state.

3. The computer readable medium of claim 2 wherein
    the intermediate network device has a memory, and
    the configuration of ports as access ports with rapid forwarding is stored at the memory.

4. The computer readable medium of claim 2 wherein the executable program instructions further comprise program instructions for placing one or more other ports in a listening spanning tree port state, upon initialization of the device.

5. The computer readable medium of claim 1 wherein the executable program instructions further comprise program instructions for generating and issuing one or more configuration bridge protocol data unit (BPDU) messages from each access port configured as rapid forwarding.

6. A computer readable medium containing executable program instructions for use by an intermediate network device having a plurality of ports for receiving and forwarding network messages, the executable program instructions comprising program instructions for:
    configuring one or more ports as access ports, wherein an access port is a port that does not provide connectivity to switches or bridges coupled to other portions of a computer network, but instead connects to a Local Area Network (LAN), a server or an end station;
    configuring one or more access ports as rapid forwarding ports;
    identifying all ports that have been configured as access ports with rapid forwarding; and
    upon initialization of the device, placing each identified access port with rapid forwarding directly to a forwarding spanning tree port state, without transitioning such identified ports between any intermediary spanning tree port states,
    wherein an end station is not coupled to a selected one of the access ports configured with rapid forwarding until after the respective access port is placed in the forwarding spanning tree port state.

7. The computer readable medium of claim 6 wherein the executable program instructions further comprise program instructions for generating and issuing one or more configuration bridge protocol data unit (BPDU) messages from each access port configured as rapid forwarding.

8. A method comprising:
    configuring one or more ports of a network device as access ports wherein an access port is a port that does not provide connectivity to switches or bridges coupled to other portions of a computer network, but instead connects to a Local Area Network (LAN), a server or an end station;
    configuring one or more access ports to have a rapid forwarding designation;

identifying the ports that have been configured as access ports with rapid forwarding designation; and upon initialization of the network device, placing each identified access port with rapid forwarding designation directly into a forwarding spanning tree port state, without transitioning such identified ports between any intermediary spanning tree port states, wherein each access port configured with rapid forwarding designation is placed in the forwarding state prior to a link-up signal being received at the respective port.

9. The method of claim 8 further comprising:

monitoring each of the one or more access ports configured with rapid forwarding port designation for receipt of a configuration bridge protocol data unit (BPDU) message; and in response to receiving a BPDU message at one of the access ports configured with rapid forwarding designation, placing the respective access port in a blocking spanning tree port state.

10. The method of claim 8 further comprising:

transitioning one or more other access ports that do not have rapid forwarding designation to a listening spanning tree port state, upon initialization of the device.

11. The method of claim 8 further comprising:

issuing one or more configuration bridge protocol data unit (BPDU) messages from each access port configured to have rapid forwarding designation.

12. An apparatus comprising:

a port configuration entity operable to maintain configuration data that indicates one or more ports of the apparatus are access ports, wherein an access port is a port that does not provide connectivity to switches or bridges coupled to other portions of a computer network, but instead connects to a Local Area Network (LAN), a server or an end station, the configuration data to also indicate that one or more of the access ports have a rapid forwarding designation;

an enhanced spanning tree entity operable to query the port configuration entity and to identify the ports that have been configured as access ports with rapid forwarding designation; and a state machine engine operable to place each identified access port with rapid forwarding designation directly into a forwarding spanning tree port state, without transition of such identified ports between any intermediary spanning tree port states, wherein the state machine engine is operable to place each identified access port with rapid forwarding designation into the forwarding spanning tree port state prior to a physical layer link-up signal being received at the respective port.

13. The apparatus of claim 12 wherein the enhanced spanning tree entity is further operable to monitor each of the one or more access ports configured with rapid forwarding port designation for receipt of a configuration bridge protocol data unit (BPDU) message, and in response to receiving a BPDU message at one of the access ports configured with rapid forwarding designation, to place the respective access port in a blocking spanning tree port state.

14. The apparatus of claim 12 wherein the state machine engine is further operable to transition one or more other access ports that do not have rapid forwarding designation to a listening spanning tree port state, upon initialization of the device.

15. The apparatus of claim 12 wherein the state machine engine is operable to place each access port with rapid forwarding designation into the forwarding spanning tree port state while the respective port is uncoupled from any end station.

16. An apparatus comprising:

means for configuring one or more ports of a network device as access ports, wherein an access port is a port that does not provide connectivity to switches or bridges coupled to other portions of a computer network, but instead connects to a Local Area Network (LAN), a server or an end station;

means for configuring one or more access ports to have a rapid forwarding designation;

means for identifying the ports that have been configured as access ports with rapid forwarding designation; and means for placing each identified access port with rapid forwarding designation directly into a forwarding spanning tree port state upon initialization of the device, without transitioning such identified ports between any intermediary spanning tree port states, wherein an end station is not coupled to a selected one of the access ports configured with rapid forwarding designation until after the respective access port is placed in the forwarding spanning tree port state.

17. An apparatus comprising:

a port configuration entity operable to maintain configuration data that indicates one or more ports have been configured with a management protocol to have a rapid forwarding designation;

an enhanced spanning tree entity operable to query the port configuration entity and to identify the ports that have been configured with rapid forwarding designation; and a state machine engine operable to place each identified port with rapid forwarding designation directly into a forwarding spanning tree port state, without transition of such identified ports between any intermediary spanning tree port states, wherein the state machine engine is operable to place each identified port with rapid forwarding designation into the forwarding spanning tree port state prior to a physical layer link-up signal being received at the port.

18. The apparatus of claim 17 wherein the enhanced spanning tree entity is further operable to monitor each of the one or more access ports configured with rapid forwarding port designation for receipt of a configuration bridge protocol data unit (BPDU) message, and in response to receiving a BPDU message at one of the access ports configured with rapid forwarding designation, to place the respective access port in a blocking spanning tree port state.

19. The apparatus of claim 17 wherein the state machine engine is further operable to transition one or more other access ports that do not have rapid forwarding designation to a listening spanning tree port state, upon initialization of the device.

20. A method comprising:

configuring one or more ports of a network device as access ports;

configure one or more access ports to have a rapid forwarding designation by selecting with a management protocol, by a network administrator, the one or more access ports to have rapid forwarding designation;

identifying the ports that have been configured as access ports with rapid forwarding designation; and upon initialization of the network device, placing each identified access port with rapid forwarding designation directly into a forwarding spanning tree port state, without transitioning such identified ports between any intermediary spanning tree port states, wherein each access port configured with rapid forwarding designation is placed in the forwarding state prior to a physical layer link-up signal being received at the respective port.

21. The method of claim 20 further comprising:

monitoring each of the one or more access ports configured with rapid forwarding port designation for receipt of a configuration bridge protocol data unit (BPDU) message; and in response to receiving a BPDU message at one of the access ports configured with rapid forwarding designation, placing the respective access port in a blocking spanning tree port state.

22. The method of claim 20 further comprising:

transitioning one or more other access ports that do not have rapid forwarding designation to a listening spanning tree port state, upon initialization of the device.

23. The method of claim 20 further comprising:

issuing one or more configuration bridge protocol data unit (BPDU) messages from each access port configured to have rapid forwarding designation.

24. An apparatus comprising:

a port configuration entity operable to maintain configuration data that indicates one or more ports have been configured with a management protocol to have a rapid forwarding designation;

an enhanced spanning tree entity operable to query the port configuration entity and to identify the ports that have been configured with rapid forwarding designation; and a state machine engine operable to place each identified port with rapid forwarding designation directly into a forwarding spanning tree port state, without transition of such identified ports between any intermediary spanning tree port states, wherein the state machine engine is operable to place each identified access port with rapid forwarding designation into the forwarding spanning tree port state while the respective port is uncoupled from any end station.

25. The apparatus of claim 24 wherein the state machine engine is operable to place each identified access port with rapid forwarding designation into the forwarding spanning tree port state prior to a physical layer link-up signal being received at the respective port.

* * * * *

UNITED STATES PATENT AND TRADEMARK OFFICE
CERTIFICATE OF CORRECTION

| | | |
|---|---|---|
| PATENT NO. | : 7,606,177 B1 | Page 1 of 1 |
| APPLICATION NO. | : 10/657499 | |
| DATED | : October 20, 2009 | |
| INVENTOR(S) | : Umesh Mahajan | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 790 days.

Col. 3, Line 3, please amend as shown:

Each bridge initially assumes itself to[[ the]] be the root and

Col. 10, Line 48, please amend as shown:

mitted. The loop-back data structure[[s]] 319, which may be the

Col. 14, Line 48, please amend as shown:

which it[[ wars]] was received, is also better than the "best" (i.e., root

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO.      : 7,606,177 B1                          Page 1 of 1
APPLICATION NO. : 10/657499
DATED           : October 20, 2009
INVENTOR(S)     : Mahajan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 790 days.

Signed and Sealed this

Fifth Day of October, 2010

David J. Kappos
*Director of the United States Patent and Trademark Office*